United States Patent [19]

Merzhanov et al.

[11] Patent Number: 5,180,698

[45] Date of Patent: Jan. 19, 1993

[54] METHOD OF PREPARING REFRACTORY CHROMIUM-CONTAINING MATERIAL

[76] Inventors: Alexandr G. Merzhanov, Ulitsa Tretya, 3, kv.2, Moskovskaya oblast, poselok Chernogolovka; Georgy I. Xandopulo, Ulitsa Mira, 166, kv.34, Alma-Ata; Mikael D. Nersesian, Institutsky prospekt, 4, kv.120, Moskovskaya Oblast, poselok Chernogolovka; Marat B. Ismailov, 8, Mikroraion, 26, kv.52, Alma-Ata; Inna P. Borovinskaya, Ulitsa Tretya, 3, kv.2, Moskovskaya oblast, poselok Chernogolovka, all of U.S.S.R.

[21] Appl. No.: 687,897

[22] PCT Filed: Apr. 25, 1989

[86] PCT No.: PCT/SU89/00112

§ 371 Date: Jun. 4, 1991

§ 102(e) Date: Jun. 4, 1991

[87] PCT Pub. No.: WO90/05120

PCT Pub. Date: May 17, 1990

[30] Foreign Application Priority Data

Oct. 31, 1988 [SU] U.S.S.R. ............... 4496508

[51] Int. Cl.$^5$ ............................. C04B 35/42
[52] U.S. Cl. ......................... 501/132; 501/94
[58] Field of Search ............. 501/132, 94, 127

[56] References Cited

U.S. PATENT DOCUMENTS

| | | | |
|---|---|---|---|
| 3,542,530 | 11/1970 | Talboom, Jr. | 501/94 |
| 4,169,734 | 10/1979 | Brezny | 501/94 |
| 4,508,835 | 4/1985 | Kaniuk et al. | 501/94 |

FOREIGN PATENT DOCUMENTS

| | | |
|---|---|---|
| 1510949 | 2/1990 | Australia . |
| 442175 | 11/1974 | U.S.S.R. . |
| 678042 | 8/1979 | U.S.S.R. . |
| 1058940 | 12/1983 | U.S.S.R. . |
| 1178736 | 9/1985 | U.S.S.R. . |
| 1294793 | 3/1987 | U.S.S.R. . |
| 1379286 | 3/1988 | U.S.S.R. . |

*Primary Examiner*—Karl Group
*Assistant Examiner*—Chris Gallo
*Attorney, Agent, or Firm*—Ladas & Parry

[57] ABSTRACT

The present invention relates to preparing refractory chromium-containing material and resides in local initiation of an exothermal reaction in a mixture of the following composition: a chromium-containing component, 8-20 mass % of a reducer selected from the group consisting of aluminium, magnesium, silicon, titanium, zirconium, or the alloys thereof, and 0.1-50 mass % of a filler, wherein as the filler use is made of periclase, sand, clay, refractory oxide, refractory scrap, wastes of blast-furnace processes, wastes of graphite or silicon carbide production, or an inorganic salt taken separately or in a mixture.

20 Claims, No Drawings

METHOD OF PREPARING REFRACTORY CHROMIUM-CONTAINING MATERIAL

TECHNICAL FIELD

The present invention relates to a method of preparing refractory chromium-containing material.

BACKGROUND OF THE INVENTION

Known in the art is a method of preparing refractory articles from a chromium-containing material (SU, A, 678042) which comprises the mixing of a chromite ore, finely ground baked magnesite, and a binder, for instance, lignosulphonate, roasting of the prepared mixture at a temperature of from 1600° to 1700° C., fractionation of the baked material, preparation of a charge from 60 mass % of chrome-magnesite bake and 40 mass % of baked magnesite powder, molding of blanks from the charge, and roasting of the blank at a temperature of from 1700° to 1800° C. The mixing of the components is performed by multiple successive delivery of portions of the binder and baked dispersed magnesite into the grainy chromite ore, the amount of each of the components in the portion being 10–25% of the required quantity.

Also known in the art is a method of preparing refractory chromium-containing material in the form of an article (U.S. Pat. No. 4,169,734) which comprises the preparation of a mixture from fractionated powders of magnesite and chromite ore at a mass ratio of 30–90: 10–70, respectively, in the presence of 0.5–1.5 mass % of a binder selected from the group consisting of: $MgCl_2$, $MgSO_4$, and $Ca(NO_3)_2$, or without a binder; molding of a blank from the prepared mixture in the presence of water under a high pressure; roasting of the blank at a temperature of from 1700° to 1800° C. to the article.

Likewise known in the art is a method of preparing refractory chromium-containing material (GB, A, 1510949) in the form of an article which comprises the preparation of a mixture from 26–56 mass % of a chromium-containing component, for instance, chromite, which is fractionated preliminarily to 0.5–5 mm (10–40 mass %) and 0.1 mm (60–90 mass %), with the fraction of the particles $\leq 0.06$ mm in size being no less than 70% of the chromite mass in said mixture. Baked magnesite (MgO) is ground preliminarily to a particle size $<0.1$ mm with the content of particle $\leq 0.06$ mm in size equal to 70% of the magnesite mass; Blanks are molded from the mixture, and are subjected to a subsequent thermal treatment of the blanks at a temperature of from 1700° to 1900° C. for 4 hours to form the articles, for instance, bricks.

The known methods are multi-stage, power-intensive, and time-consuming. The prepared materials are characterized by refractoriness values not exceeding 1600° C. which limits the field of application. Physical and mechanical characteristics of these materials are not constant and greatly depend on the dispersity of the initial components in the mixture which deteriorates essentially the quality of the articles manufactured from the above materials.

The principal object of the invention is to provide a method of preparing refractory chromium-containing material via a qualitative change of the composition of the mixture and thermal treatment conditions which will improve essentially physical and mechanical characteristics of the final material, simplify the technological process, and decrease energy consumption.

Said object is accomplished by a method of preparing refractory chromium-containing material comprising the preparation of a mixture from a chromium-containing component and a binder and thermal treatment of the mixture, wherein, according to the invention, as the binder introduced in an amount of 0.1–50 mass %, use is made of periclase, sand, clay refractory oxide, refractory scrap, wastes of blast-furnace processes, graphite production, and silicon carbide production, and inorganic salts taken separately or in a mixture. 8–20 mass % of a reducer is additionally introduced into the above mixture. As the reducer, use is made of at least one of the metals selected from the group consisting of aluminium, magnesium, silicon, zirconium, titanium and alloys thereof, after which the prepared exothermal mixture is subjected to thermal treatment under combustion conditions.

The use of the above-described method ensures the preparation of refractory chromium-containing material with refractoriness 1700°–2000° C., compression strength up to 70 MPa, porosity 14–56%, density 2.5–3.2 $g/cm^3$, and characterized by uniformity of the properties over the whole bulk.

The mixture prepared by the above-proposed method represent an exothermal mixture able to burst into flame upon local initiation at any site with the aid of an electric coil, electric arc, or laser beam. The claimed ratio of the components of the exothermal mixture, as well as the combustion conditions, were chosen experimentally.

At the site of initiation (or inflammation) a wave of synthesis is generated which propagates with a bright glow along the whole bulk of the packed exothermal mixture, transforming said mixture into a strongly baked final refractory product. High temperatures arising from combustion ensure a complete reaction of the initial components and preparation of refractory material uniform over the whole bulk (with a small scatter of typical parameters). A deviation from the claimed ratio of the components results in the combustion front being attenuated and synthesis of the final product either does not occur at all or proceeds nonuniformly which then leads to deterioration of the quality of the final materials or articles.

The presence in the exothermal mixture of a reducer selected from the above metals or alloys thereof and taken in amount of 8–20 mass % ensures the inflammation of the mixture upon initiation which results in a simultaneous oxidation of the reducer and fast heat homogenization over the whole bulk of the initial mixture and, hence, in a high uniformity of the properties of the final material over the whole bulk. The content of the reducer is chosen according to the technological conditions, the nature of the initial components, and the qualitative composition of the final material. A lower content of the reducer decreases the efficiency of combustion and worsens the quality of the final product. A rise in the reducer content results in vigorous combustion, and ejection of the components, violates stoichiometry of the initial components, and deteriorates the quality of the final product because of melting and a change in uniformity of the composition. It is recommended to use as the reducer a mixture of at least two of the above metals taken at an equatomic ratio or an aluminum alloy selected from the group consisting of $Al_3Mg_2$, $Al_3Mg_4$, $AlMg$, $Al_2Mg_3$, and $TiAl$. The combustion process becomes in this case more controllable, the quality of the final product can be more easily varied and its characteristics improved. Besides, the safety of the process enhanced, which is very important for industrial production. The use of Al-Zr and Si-Al alloys is also possible due to a similar effect. The metals can also be used as powders, wastes of aluminum and silicon industries, and sponge (titanium, zirconium).

As the chromium-containing component it is expedient to introduce into the exothermal mixture chromite (chromium ore), chromium oxide, chromium sulphate, chromate of one of the alkali metals selected from the group consisting of: calcium, barium, and magnesium, taken separately or in a mixture. The chromium-containing component is used predominantly in the form of powders 1-1000 $\mu$m in dispersity and granules 1-5 mm in size; the fraction composition of the component can be varied both within and beyond the claimed limits depending on the type of the refractory material. For instance, for manufacturing large refractory articles dispersity of the chromium-containing component can be varied, according to the invention, from 1 $\mu$m to 5 mm whereas for small articles (crucibles, tubes) and coatings from 1 to 500 $\mu$m. The proposed method does not require preliminary fractionation of the powders, that is after the grinding of the initial components and determination of the total granulometric composition, the powders are directed for the production of the final products. Some deviations in dispersity of the chromium-containing components being used are also possible but in this case the content of the fraction 1 $\mu$m must not exceed 20 mass %, and that of the fraction >5 mm must be no more than 30 mass % of the granulometric composition of the chromium-containing components. Chromium compounds can be employed as slimes and wastes of the corresponding productions. Chromite is used when chromium oxide content is no less than 30 mass %.

The binder introduced into the exothermal mixture in amount of 0.1-50 mass % and having the above composition ensures a decrease in the combustion temperature, thereby providing the preparation of a high quality end product. The use of wastes of blast-furnace production, refractory scrap, wastes of graphite and silicon carbide production as the binder makes the process cheaper and influences favorably the ecological situation at the site of production due to utilization of wastes. Any deviation of the binder content in the mixture from 0.1-50 mass % decreases the efficiency of the combustion process which lowers the yield and worsens the quality of the final refractory material. It is recommended to use as the binder at least one refractory oxide selected from the group. Consisting of $TiO_2$, $ZrO_2$, MgO, CaO, $Y_2O_3$, $SiO_2$, and $Al_2O_3$ or at least one inorganic salt selected from the group. Consisting of magnesium or aluminum sulphate, chloride, or nitrate, sodium silicate, and a mixture of at least two of said salts. The binder can be used in the form of powders with a dispersity of from 1 to 1000 $\mu$m, fibers or whiskers from $\leq$1 $\mu$m to 1 mm in diameter. The dispersity of the binders depends on the function of refractory materials, affects the characteristics of these materials, and is varied in a wide range from 1 $\mu$m to 50 mm. For manufacturing large refractory articles, for instance, plates, according to the invention, coarsely dispersed binders with a particle size up to 50 mm can be used and for manufacturing crucibles or cups the dispersity of the binders must be from 1 to 1000 $\mu$m. The fraction composition of a powderous binder from 1 to 1000 $\mu$m is preferable and can be changed in any direction but the content of fractions <1 $\mu$m must not exceed 10 mass % and that of fractions >1000 $\mu$m must be no more than 20 mass % of the granulometric composition of the binder. In the process of preparing refractory material it can be shaped as required, that is the required article can be manufactured from the material. For this purpose, a blank is prepared from the exothermal mixture either by filling up a mold or by molding with the use of aqueous solutions of inorganic salts, that is water soluble fillers playing the role of binders. The use of wetted mixtures allows a coating to be made and an article of a complex configuration to be manufactured. Water is added in amounts required for preparing a liquid mobile mass. After molding the exothermal mixture in the form of an article or coating, water is removed by preliminary heating (drying). As the solvent use can be made of water, alcohol, water-alcohol, and water-acetone solutions. The heating of the packed exothermal mixture prior to thermal heating up to 100°-800° C. is needed for removal of the moisture and for a rise of the combustion temperature of weakly exothermal compositions and thus favors the preparation of a high-quality end material. Said temperature range depends on the composition of the exothermal mixture and can be changed towards high temperatures. The proposed method accomplished in the combustion mode is highly effective due to simple technology. The manufacturing of articles and coatings from refractory material can be performed in air without using reactors and furnaces, several syntheses can be accomplished simultaneously, and industrial application of the method does not require additional technological areas. The method is characterized by low energy-intensity, high capacity, and high quality of the prepared refractory chromium-containing materials and corresponding articles. The method makes it possible to obtain a high-quality coating on large surfaces with complex profiles. The use of wastes of blast-furnace and other processes as the binder favors a partial solution of waste utilization and ecology problems.

Best Mode for Carrying out the Invention

An exothermal mixture is prepared from a chromium-containing component chromium (VI) oxide in the form of a power with a dispersity of up to 1 mm, a reducer (aluminum) as chips, and a filler (refractory clay) as granules 1-5 mm in size at a following ratio thereof (mass %):

| | |
|---|---|
| chromium (VI) oxide | 55.1 |
| aluminum | 14.9 |
| refractory clay | 30. |

Bricks with dimensions 250×120×65 mm are manufactured from the prepared mixture by filling up the molds and initiating the combustion of the mixture in air by the delivery of an electric pulse to a metal coil. The interaction of the components takes place due to the heat liberated in the combustion reaction. The combustion front propagates along the blanks for 10-15 s at a rate of from 1 to 5 cm/s. Baked bricks are kept in molds for cooling.

The refractory material of each brick has a density of 2.5 g/cm$^3$, porosity 35%, compression strength 21.0 MPa, refractoriness 1650° C. The yield of good bricks is 98%.

EXAMPLE 1

An exothermal mixture is prepared from powders of 50 mass % of magnesium chromate with a dispersity of 1–100 μm, 20 mass % of an Al-Mg alloy with a dispersity of 200 μm, and 30 mass % of magnesium oxide with a dispersity of 1–50 μm.

To mold a blank in the form of a crucible, the prepared mixture is poured into a cavity formed by the walls and bottoms of each of two co-axially located carton cups placed into a mold filled with sand. The combustion reaction is initiated with an electric coil. After passing of the combustion front along the blank, the baked crucible is cooled in sand to room temperature and taken out from sand.

The obtained crucible can be used for melting metals (Cu, Ag) and for work with aggressive media at enhanced temperatures. The refractory material of the crucible has a density of 3.21 g/cm$^3$, porosity 30.1%, compression strength 26.0 MPa, and refractoriness 1960° C.

EXAMPLE 2

An exothermal mixture is prepared from 75.3 mass % of finely dispersed chromite, 20.5 mass % of aluminum powder with a dispersity of 1–100 μm, and a water solution of magnesium sulphate in amount of 4.2 mass %. A crucible-shaped blank with the following dimensions: diameter 500 mm, heigt 800 mm, wall thickness 45 mm, is mold from the obtained wet mass. For this purpose the mixture is placed into a cavity formed by the walls and bottoms of each of two co-axially located cups made of fabric or porous paper on a metal mesh cage. The cups are placed into the mold filled with sand. The blank is dried at 450° C. for 10 hrs and the combustion is initiated by a welding electrode. After cooling, the crucible is ready for operation. The refractory material of the crucible has a compression strength of 60 MPa and refractoriness 1800° C.

EXAMPLE 3

An exothermal mixture is prepared from powders of 78.5 mass % of magnesium chromate (dispersity 1–500 μm), 16.4 mass % of aluminum (dispersity 1–300 μm), and 0.1 mass % of aluminum oxide (dispersity 1–400 μm) with a subsequent addition into the mixture of sodium hexame-taphosphate in the form of water-alcohol solution in amount of 35% of the mass of the mixture. The obtained wet mass is applied to the surface of chromatomagnesite brick as a 20 mm layer, dried at 400° C., and then the combustion is initiated. The strength of the coating-to-brick bond is 35 MPa, the compression strength is 36 MPa, refractoriness 1880° C.

EXAMPLE 4

An exothermal mixture is prepared from 75.3 mass % of finely ground chromite (dispersity 0.3 mm), 20.5 mass % of aluminum (dispersity 0.3 mm), and 4.2 mass % of aqueous solution of magnesium sulphate. The obtained wet mass is placed into a burn-out hollow (500×500×150 mm) in the coating of the roaster lining, dired, heated to 350° C., and the combustion is initiated. After the completion of the combustion process the burn-out site is reclaimed. The refractory material formed in the burn-out site has a porosity of 57%, compression strength 58.8 MPa, refractoriness 1790° C.

EXAMPLE 5

An exothermal mixture is prepared from 77.8 mass % of finely ground chromite (dispersity 1–1000 μm), 16.1 mass % of aluminum chips, and 6.1 mass % of aluminum sulphate aqueous solution. The obtained wet mass is shotcreted with the aid of a cement-gun onto the chamotte surface as a layer 110 mm thick in the baking zone (the chamotte layer 120 mm thick) and 70 mm thick in the cooling zone (the chamotte layer 230 mm).

After hardening the mass in air, the furnace is lighted with burners operating under minimum conditions and drying is performed at a temperature of no less than 500° C., the temperature fields being controlled by thermocouples. The combustion is initiated by changing the mode of burner operation to normal and the moment of inflammation and combustion can be observed visually and by indications of the thermocouples. When the temperature fields in the layer of the coating become stationary, the raw material can be delivered to the furnace for roasting. The material of the obtained coating has the following characteristics: refractoriness 1800° C., compression strength 65 MPa, porosity 35%.

The Table below illustrates the examples 6–31 of preparing articles and coatings from refractory chromium-containing material, according to the invention, and shows the composition of exothermal mixtures, the conditions of the process, type and dimensions of the articles, physical and mechanical characteristics of the material of the article.

INDUSTRIAL APPLICABILITY

The material prepared by the proposed method will find application in manufacturing crucibles, bricks, tubes, plates, and for applying protective coatings on working surface of parts and units in converters, blast and open-hearth furnaces, as well as linings in high-temperature metallurgical aggregates, cement and coke-chemical ovens.

TABLE

| | Composition of exothermal mixture mass % | | | Temperature of heating, °C. | Type and dimensions of the article, mm | Physical and mechanical characteristics of the material | | | Yield of good product, mass, % |
|---|---|---|---|---|---|---|---|---|---|
| No. | Chromium-containing component | Reducer | Filler | | | Porosity % | Compression strength, MPa | Refractoriness, °C. | |
| 1 | 2 | 3 | 4 | 5 | 6 | 7 | 8 | 9 | 10 |
| 6 | CrO$_3$ + Cr$_2$(SO$_4$)$_3$ 54.8 | Al 18.7 | Al$_2$O$_3$ 26.5 | | brick 250 × 120 × 65 | 30.0 | 22.0 | 1750 | 96 |
| 7 | CrO$_3$ 49.5 | Si 10.5 | SiO$_2$ 40.0 | | brick 250 × 120 × 65 | 35.0 | 15.0 | 1700 | 96 |
| 8 | CrO$_3$ + Cr$_2$O$_3$ 53.5 | Al + Mg 7.4 + 9.1 | wastes of blast-furnace processes 30.0 | | plate 500 × 400 × 80 | 32.0 | 20.0 | 1700 | 98 |

TABLE-continued

| No. 1 | Composition of exothermal mixture mass % | | | Temperature of heating, °C. 5 | Type and dimensions of the article, mm 6 | Physical and mechanical characteristics of the material | | | Yield of good product, mass, % 10 |
| --- | --- | --- | --- | --- | --- | --- | --- | --- | --- |
| | Chromium-containing component 2 | Reducer 3 | Filler 4 | | | Porosity % 7 | Compression strength, MPa 8 | Refractoriness, °C. 9 | |
| 9 | CrO$_3$ 42.0 | Al 8.0 | refractory scrap 50.0 | 200 | plate 500 × 400 × 80 | 35.0 | 17.5 | 1750 | 95 |
| 10 | BaCrO$_4$ 91.9 | Al 8.0 | Al$_2$O$_3$ + sand 0.1 | | brick 250 × 125 × 60 | 22.0 | 29.0 | 1750 | 95 |
| 11 | CrO$_3$ + CaCrO$_4$ 61.9 | Al 13.1 | CaO 25.0 | | brick 250 × 125 × 60 | 14.7 | 60.4 | 1930 | 98 |
| 12 | MgCrO$_4$ 50.0 | Al + Mg 20.0 | MgO 30.0 | 150 | crucible | 36.5 | 20.0 | 1900 | 80 |
| 13 | MgCrO$_4$ + CaCrO$_4$ 71.0 | Al$_3$Mg$_2$ 14,0 | ZrO$_2$ 15.0 | | brick | 25.0 | 28.5 | 1850 | 98 |
| 14 | CaCrO$_4$ 66.6 | Al$_3$Mg$_4$ 13.4 | Al$_2$O$_3$ + MgO 10.0 + 10.0 | | " | 18.0 | 29.0 | 1850 | 98 |
| 15 | MgCrO$_4$ 72.5 | Zr 12.5 | Y$_2$O$_3$ 15.0 | | " | 18.0 | 54.0 | 2000 | 98 |
| 16 | CrO$_3$ 50.0 | Ti + Al 25,0 | TiO$_2$ (whiskers) 25,0 | | " | 21.0 | 62.0 | 1800 | 97 |
| 17 | CrO$_3$ 50.0 | TiAl 25.0 | TiO$_2$ 25.0 | | brick 125 × 120 × 60 | 25 | 55 | 1780 | 97 |
| 18 | MgCrO$_4$ 67.5 | Mg 17.5 | MgO (granules) 15.0 | | brick 250 × 120 × 65 | 22.2 | 34.0 | 2000 | 98 |
| 19 | CrO$_3$ 51.5 | Ti + SiO$_2$ 18.5 | wastes of graphite production 15.0 + 15.0 | | brick 125 × 120 × 60 | 40 | 32 | 1750 | 98 |
| 20 | CrO$_3$ 51.5 | Ti + Si 8.0 + 10.5 | SiO$_2$ + wastes of grafite production 15.0 + 15.0 | | brick 125 × 120 × 60 | 36 | 34 | 1700 | 98 |
| 21 | CrO$_3$ 49.5 | Si 10.5 | SiO$_2$ + wastes of silicon carbide production 20.0 + 20.0 | | brick 125 × 120 × 60 | 35 | 28 | 1800 | 96 |
| 22 | Chromite 76.4 | Al 15.8 | MgSO$_4$ + Mg(NO$_3$)$_2$ 3.9 + 3.9 | 400 | brick 250 × 125 × 60 | 50 | 60.0 | 1800 | 97 |
| 23 | Chromite 78.7 | Al + Mg 10.5 + 2.9 | MgCl$_2$ 7,9 | 600 | tube φ40 wall thickness 10 MM | 45 | 56.0 | 1800 | 95 |
| 24 | Chromite 76.4 | Al 15.8 | NaH$_2$PO$_4$ 7.8 | 300 | block 600 × 40 × 40 | 55 | 64.0 | 1800 | 96 |
| 25 | Chromite 62.0 | Al 13.0 | Na$_2$SiO$_3$ 25.0 | 550 | crucible φ500 H = 800 | 35 | 60.0 | 1800 | 95 |
| 26 | Chromite 69.6 | Al 15.2 | Al$_2$(SO$_4$)$_3$ + wastes of blast-furnace processes 3.2 + 10.0 | 800 | pan | 48 | 62.0 | 1800 | 100 |
| 27 | CaCrO$_4$ 78.0 | Al 13.0 | MgSO$_4$ + Al$_2$O$_3$ 2.6 + 6.4 | 200 | brick | 18.0 | 31.0 | 1900 | 98 |
| 28 | CaCrO$_4$ 71 | Al$_2$Mg$_3$ 14.5 | Na$_2$HPO$_4$ + Al$_2$O$_3$ 7.9 + 6.6 | 300 | coating | 18.2 | 32.2 | 1880 | 100 |
| 29 | Chromite 70 | Al 21 | MgSO$_4$ + MgO 2.0 + 7.0 | 700 | coating | 56 | 62.0 | 1800 | 100 |
| 30 | Chromite 75.3 | Al + Mg 9.6 + 10.9 | MgSO$_4$.7H$_2$O 4.2 | 200 | coating | 45 | 70.0 | 1820 | 100 |
| 31 | MgCrO$_4$ 67.1 | Al 12.9 | Mg(NO$_3$)$_2$ + CaO 15.0 + 15.0 | 100 | coating on refractory brick | 16.0 | 31.2 | 1950 | 100 |

We claim:

1. A method of producing a refractory chromium-containing material comprising preparing an exothermal mixture of a chromium-containing component, a filler and a reducer, and thermally treating the mixture under combustion conditions to form the refractory chromium-containing material, said reducer comprising at least one metal selected from the group consisting of aluminum, magnesium, silicon, zirconium, titanium, and alloys thereof and being present in said mixture in an amount of about 8 to 20% by weight, said filler being selected from the group consisting of periclase, sand, clay, refractory scrap, silicon carbide production waste and an inorganic acid salt and being present in said mixture in an amount of about 0.1 to 50% by weight.

2. A method as claimed in claim 1, wherein the reducer comprises at least two metals selected from the group consisting of aluminum, magnesium, silicon, zirconium, titanium, and alloys thereof, said at least two metals being present at an equatomic ratio.

3. A method as claimed in claim 1, wherein said at least one metal comprises an aluminum alloy selected from the group consisting of Al$_3$Mg$_2$, Al$_3$Mg$_4$, AlMg, Al$_2$Mg$_3$, and TiAl.

4. A method as claimed in claim 1, wherein the chromium-containing component comprises chromite, chromium oxide, chromium sulphate, or a chromate of an alkaline-earth metal selected from the group consisting of calcium, barium, and magnesium.

5. A method as claimed in claim 4, wherein the chromium-containing component comprises a mixture of at least two compounds comprising chromite, chromium oxide, chromium sulphate, or a chromate of an alkaline-earth metal selected from the group consisting of calcium, barium, and magnesium.

6. A method as claimed in claim 1, wherein said filler comprises at least one oxide selected from the group consisting of $TiO_2$, $ZrO_2$, MgO, CaO, $Y_2O_5$, $SiO_2$, and $Al_2O_3$.

7. A method as claimed in claim 1, wherein said inorganic acid salt is selected from the group consisting of magnesium sulphate, aluminum sulphate, magnesium chloride, aluminum chloride, magnesium nitrate, aluminum nitrate, sodium phosphate, aluminum phosphate, and sodium silicate.

8. A method as claimed in claim 7, wherein the inorganic acid salt comprises a mixture of at least two compounds selected from the group consisting of magnesium sulphate, aluminum sulphate, magnesium chloride, aluminum chloride, magnesium nitrate, aluminum nitrate, sodium phosphate, aluminum phosphate, and sodium silicate.

9. A method as claimed in claim 1, wherein the exothermal mixture is molded into a blank and is thermally treated under combustion conditions to form a molded article comprising said refractory chromium-containing material.

10. A method as claimed in claim 9, characterized in that said blank is heated to 100°–800° C. prior to thermal treatment.

11. A refractory chromium containing material prepared by a method substantially as set forth in claim 1, wherein the material has refractoriness values of between about 1700° and 2000° C. and possess uniform properties throughout its bulk.

12. A refractory chromium containing material prepared by a method substantially as set forth in claim 2, wherein the material has refractoriness values of between about 1700° and 2000° C. and possess uniform properties throughout its bulk.

13. A refractory chromium containing material prepared by a method substantially as set forth in claim 3, wherein the material has refractoriness values of between about 1700° and 2000° C. and possess uniform properties throughout its bulk.

14. A refractory chromium containing material prepared by a method substantially as set forth in claim 4, wherein the material has refractoriness values of between about 1700° and 2000° C. and possess uniform properties throughout its bulk.

15. A refractory chromium containing material prepared by a method substantially as set forth in claim 5, wherein the material has refractoriness values of between about 1700° and 2000° C. and possess uniform properties throughout its bulk.

16. A refractory chromium containing material prepared by a method substantially as set forth in claim 6, wherein the material has refractoriness values of between about 1700° and 2000° C. and possess uniform properties throughout its bulk.

17. A refractory chromium containing material prepared by a method substantially as set forth in claim 7, wherein the material has refractoriness values of between about 1700° and 2000° C. and possess uniform properties throughout its bulk.

18. A refractory chromium containing material prepared by a method substantially as set forth in claim 8, wherein the material has refractoriness values of between about 1700° and 2000° C. and possess uniform properties throughout its bulk.

19. A refractory chromium containing material prepared by a method substantially as set forth in claim 9, wherein the material has refractoriness values of between about 1700° and 2000° C. and possess uniform properties throughout its bulk.

20. A refractory chromium containing material prepared by a method substantially as set forth in claim 10, wherein the material has refractoriness values of between about 1700° and 2000° C. and possess uniform properties throughout its bulk.

* * * * *